US011872830B2

(12) United States Patent
Matsuura

(10) Patent No.: US 11,872,830 B2
(45) Date of Patent: Jan. 16, 2024

(54) THERMAL TRANSFER IMAGE-RECEIVING SHEET

(71) Applicant: Dai Nippon Printing Co., Ltd., Tokyo (JP)

(72) Inventor: Hiroshi Matsuura, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 338 days.

(21) Appl. No.: 16/962,975

(22) PCT Filed: Sep. 20, 2018

(86) PCT No.: PCT/JP2018/034788
§ 371 (c)(1),
(2) Date: Nov. 29, 2021

(87) PCT Pub. No.: WO2019/181010
PCT Pub. Date: Sep. 26, 2019

(65) Prior Publication Data

US 2022/0219477 A1 Jul. 14, 2022

(30) Foreign Application Priority Data

Mar. 22, 2018 (JP) ................................ 2018-054979

(51) Int. Cl.
*B41M 5/50* (2006.01)

(52) U.S. Cl.
CPC ............ *B41M 5/502* (2013.01); *B41M 5/504* (2013.01); *B41M 5/506* (2013.01); *B41M 5/508* (2013.01)

(58) Field of Classification Search
CPC ...... B41M 5/502; B41M 5/504; B41M 5/506; B41M 5/508

(Continued)

(56) References Cited

U.S. PATENT DOCUMENTS

2007/0252887 A1 11/2007 Mizuhara et al.
2007/0292638 A1* 12/2007 Kim ...................... B41M 5/502 428/32.2

(Continued)

FOREIGN PATENT DOCUMENTS

JP 2000-019684 A1 1/2000
JP 2006-027264 A1 2/2006

(Continued)

OTHER PUBLICATIONS

Thermal Transfer Image-Receiving Sheet and Manufacturing Method for the Same. JP2010234762A (Year: 2010).*

(Continued)

*Primary Examiner* — Betelhem Shewareged
(74) *Attorney, Agent, or Firm* — BURR PATENT LAW, PLLC

(57) ABSTRACT

[Problem] To provide a thermal transfer image-receiving sheet that enables a high-density image to be formed on the receiving layer, has high easiness of cutting, and in addition, has high concave curl generation preventiveness.
[Solution] A thermal transfer image-receiving sheet according to the present invention is characterized by including a first extrusion resin layer, a substrate, a second extrusion resin layer, a porous layer, and a receiving layer, wherein the ratio of the total of the thickness of the second extrusion resin layer and the thickness of the porous layer to the thickness of the first extrusion resin layer (the total of the thickness of the second extrusion resin layer and the thickness of the porous layer/the thick of the first extrusion resin layer) is 1.05 or more and 1.40 or less, and the substrate has a bending resistance of 1600 mg or more and 2500 mg or less.

7 Claims, 1 Drawing Sheet

(58) Field of Classification Search
USPC .................................................... 428/32.39
See application file for complete search history.

(56) References Cited

U.S. PATENT DOCUMENTS

| | | | | |
|---|---|---|---|---|
| 2007/0298228 | A1* | 12/2007 | Ohkawachi ............. | C08L 67/02<br>428/220 |
| 2013/0288030 | A1* | 10/2013 | Yeu ........................ | D21H 19/20<br>427/361 |
| 2017/0100953 | A1 | 4/2017 | Aoyagi et al. | |
| 2022/0219477 | A1* | 7/2022 | Matsuura ............... | D21H 19/82 |

FOREIGN PATENT DOCUMENTS

| | | | |
|---|---|---|---|
| JP | 2010-234762 | A1 | 10/2010 |
| JP | 2015-193251 | A1 | 11/2015 |

OTHER PUBLICATIONS

International Search Report and Written Opinion (Application No. PCT/JP2018/034788) dated Dec. 4, 2018.
Japanese Office Action (Application No. 2020-507309) dated Jun. 26, 2020 (with English translation).
Extended European Search Report (Application No. 18910856.6) dated Sep. 24, 2021.
English translation of International Preliminary Report on Patentability (Chapter 1) (Application No. PCT/JP2018/034788) dated Oct. 1, 2020, 11 pages.
Tappi, TAPPI T 543 om-00, "Bending resistance of paper (Gurley-type tester)," Jan. 1, 2000, XP055841638.

* cited by examiner

THERMAL TRANSFER IMAGE-RECEIVING SHEET

TECHNICAL FIELD

The present invention relates to thermal transfer image-receiving sheets.

BACKGROUND ART

Various printing methods are conventionally known, and among those, a sublimation type thermal transfer method enables density gradation to be freely adjusted, has excellent reproducibility of neutral colors and of gradation, and makes it possible to form high-quality images comparable to silver halide photographs.

According to this sublimation type thermal transfer method, a thermal transfer sheet having a dye layer comprising a sublimation dye and a thermal transfer image-receiving sheet having a receiving layer are superposed onto each other; the thermal transfer sheet is then heated by a thermal head of a thermal transfer printer; the sublimation dye in the dye layer is thus transferred to the receiving layer of the thermal transfer image-receiving sheet to form an image; and accordingly, an image-printed item is obtained. A thermal transfer image-receiving sheet usually needs to allow a high-density image to be formed on the receiving layer, and needs to be able to be easily cut into a desired size after the image is formed (this characteristic is hereinafter referred to as easiness of cutting).

An image-printed item produced using a conventional thermal transfer image-receiving sheet depends on the environmental factors (temperature, humidity, and the like), and accordingly generates, over time, a curl concave on the receiving layer side (hereinafter, simply referred to as a concave curl), and such a curl becomes conspicuous when the image-printed item is placed flatly or pasted on a wall, thus posing the possibility that the image-printed item is degraded.

SUMMARY OF INVENTION

Technical Problem

The present invention has been made in view of the above-mentioned problems, and an object of the present invention is to provide a thermal transfer image-receiving sheet that enables a high-density image to be formed on the receiving layer, has high easiness of cutting, and in addition, has high concave curl generation preventiveness.

Solution to Problem

A thermal transfer image-receiving sheet according to the present invention is characterized by including a first extrusion resin layer, a substrate, a second extrusion resin layer, a porous layer, and a receiving layer, wherein the ratio of the total of the thickness of the second extrusion resin layer and the thickness of the porous layer to the thickness of the first extrusion resin layer (the total of the thickness of the second extrusion resin layer and the thickness of the porous layer/the thick of the first extrusion resin layer) is 1.05 or more and 1.40 or less, and the substrate has a bending resistance of 1600 mg or more and 2500 mg or less.

In one embodiment, the substrate is coated paper.

In one embodiment, the ratio of the thickness of a coated layer of the coated paper to the thickness of the coated paper (the thickness of the coated layer/the thickness of the coated paper×100) is 5% or more and 20% or less.

In one embodiment, at least one of the first extrusion resin layer and the second extrusion resin layer comprises an olefin resin.

In one embodiment, the porous layer is formed of a porous film.

In one embodiment, the substrate has a bending resistance of 1000 mg or more and 1500 mg or less in the MD direction.

In one embodiment, the substrate has a bending resistance of 600 mg or more and 1000 mg or less in the TD direction.

Advantageous Effects of Invention

The present invention can provide a thermal transfer image-receiving sheet that enables a high-density image to be formed on the receiving layer, has high easiness of cutting, and in addition, has high concave curl generation preventiveness.

DESCRIPTION OF EMBODIMENTS (Thermal Transfer Image-Receiving Sheet)

Figure 1:
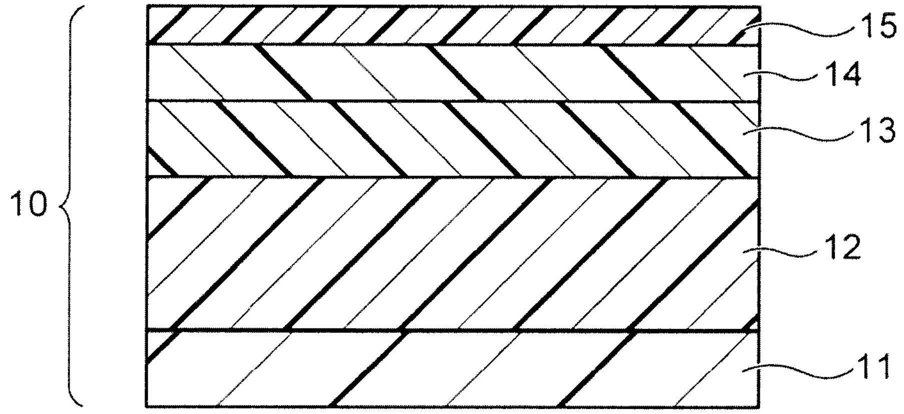
FIG. 1 is a schematic cross-sectional view of a thermal transfer image-receiving sheet in one embodiment.

A thermal transfer image-receiving sheet 10 according to the present invention includes a first extrusion resin layer 11, a substrate 12, a second extrusion resin layer 13, a porous layer 14, and a receiving layer 15, as shown in FIG. 1.

In another embodiment, a thermal transfer image-receiving sheet 10 according to the present invention has an intermediate layer (not shown) between the substrate 12 and the receiving layer 15.

In a thermal transfer image-receiving sheet according to the present invention, the ratio of the total of the thickness of the second extrusion resin layer and the thickness of the porous layer to the thickness of the first extrusion resin layer (the total of the thickness of the second extrusion resin layer and the thickness of the porous layer/the thick of the first extrusion resin layer) is 1.05 or more and 1.40 or less. In addition, the ratio is more preferably 1.10 or more and 1.35 or less. This can further enhance the concave curl generation preventiveness of the thermal transfer image-receiving sheet.

Below, the layers of a thermal transfer image-receiving sheet according to the present invention will each be described.

(First Extrusion Resin Layer)

The first extrusion resin layer comprises a resin material, and examples of such resin materials include ester resins such as polyethylene terephthalate (PET), polybutylene terephthalate (PBT), polyethylene naphthalate (PEN), 1,4-polycyclohexylene dimethylene terephthalate, and terephthalic acid-cyclohexanedimethanol-ethylene glycol copolymers; amide resins such as nylon 6 and nylon 6,6; olefin resins such as polyethylene (PE), polypropylene (PP), and polymethylpentene; vinyl resins such as polyvinyl chloride, polyvinyl alcohol (PVA), polyvinyl acetate, vinyl chloride-vinyl acetate copolymers, polyvinylbutyral, and polyvinylpyrrolidone (PVP); (meth)acryl resins such as polyacrylate, polymethacrylate, and polymethylmetacrylate; imide resins such as polyimides and polyetherimides; cellulose resins such as cellophane, cellulose acetate, nitrocellulose, cellulose acetate propionate (CAP), and cellulose acetate butyrate (CAB); polystyrene (PS); polycarbonate; ionomer resins; and the like.

Among the above-mentioned materials, olefin resins are preferable, and PE is particularly preferable, because these can enhance the density of an image formed on the receiving layer and the concave curl generation preventiveness of the thermal transfer image-receiving sheet.

In the present invention, "(meth)acryl" encompasses both "acryl" and "methacryl".

The amount of the resin material comprised in the first extrusion resin layer is preferably 50 mass % or more and 99 mass % or less, more preferably 70 mass % or more and 95 mass % or less. This can further enhance the density of an image formed on the receiving layer and the concave curl generation preventiveness of the thermal transfer image-receiving sheet.

The first extrusion resin layer can comprise an additive such as a release agent, plasticizer, filler, ultraviolet stabilizer, color protection agent, surfactant, fluorescent whitener, delusterant, deodorant, flame retardant, weathering agent, antistatic agent, yarn friction reducer, slip agent, antioxidant, ion exchanger, dispersant, ultraviolet absorber, or colorant such as pigment or dye to the extent that the characteristics of the present invention are not impaired.

The first extrusion resin layer preferably has a thickness of 20 μm or more and 35 μm or less, more preferably 25 μm or more and 32 μm or less. This can further enhance the density of an image formed on the receiving layer and the concave curl generation preventiveness of the thermal transfer image-receiving sheet.

The first extrusion resin layer can be formed by allowing a mixture comprising the above-mentioned resin materials to be melt-extruded onto the substrate.

(Substrate)

The substrate of a thermal transfer image-receiving sheet according to the present invention has a bending resistance of 1600 mg or more and 2500 mg or less. In addition, the substrate preferably has a bending resistance of 1700 mg or more and 2400 mg or less, more preferably 1800 mg or more and 2300 mg or less. This can further enhance the easiness of cutting of the thermal transfer image-receiving sheet and the concave curl generation preventiveness thereof.

As used herein, the bending resistance of a substrate refers to the total of the bending resistance of the substrate in the MD direction and the bending resistance of the substrate in the TD direction. The TD direction of the substrate is short for Transverse Direction, and refers to the flow direction of rolled paper in production of image-printed items. The MD direction of the substrate is short for Machine Direction, and refers to the direction perpendicular to the TD direction. In the present invention, the bending resistance is measured using a Gurley stiffness tester manufactured by Toyo Seiki Seisaku-sho, Ltd. in an environment having a temperature of 25° C. and a humidity of 50% in accordance with the method described in JIS L 1085.

In addition, the substrate preferably has a bending resistance of 1000 mg or more and 1500 mg or less, more preferably 1100 mg or more and 1400 mg or less, in the MD direction. This can further enhance the easiness of cutting of the thermal transfer image-receiving sheet and the concave curl generation preventiveness thereof.

In addition, the substrate preferably has a bending resistance of 600 mg or more and 1100 mg or less, more preferably 700 mg or more and 900 mg or less, in the TD direction. This can further enhance the easiness of cutting of the thermal transfer image-receiving sheet and the concave curl generation preventiveness thereof.

In addition, the substrate needs to have a heat resistance that can withstand thermal energy applied during thermal transfer (for example, heat of a thermal head), and needs to have a mechanical strength that can support a receiving layer and the like provided on the substrate. Examples of such substrates that can be used include: paper substrates such as high-quality paper, art paper, coated paper, resin-coated paper, cast-coated paper, paperboard, synthetic paper, and impregnated paper; films formed of a resin material such as an ester resin, amide resin, olefin resin, vinyl resin, or (meth)acryl resin (hereinafter, simply referred to as a "resin film"); and laminates thereof.

Among the above-mentioned materials, coated paper is particularly preferable in terms of the concave curl generation preventiveness of the thermal transfer image-receiving sheet.

As used herein, coated paper refers to medium-grade paper or high-quality paper having a coated layer on at least one face thereof, wherein the coated layer is formed of a coat material. The coat material comprises, for example, kaolin, a white pigment such as calcium carbonate, or a binder resin.

The coated layer of coated paper used as a substrate preferably has a thickness of 10 μm or more and 30 μm or less, more preferably 15 μm or more and 25 μm or less. This can further enhance the concave curl generation preventiveness of the thermal transfer image-receiving sheet.

In addition, the ratio of the thickness of the coated layer to the thickness of the coated paper (the thickness of the coated layer/the thickness of the coated paper×100) is preferably 5% or more and 20% or less, more preferably 7% or more and 17% or less. This can further enhance the concave curl generation preventiveness of the thermal transfer image-receiving sheet.

In the present invention, the thickness of a coated layer refers to the thickness of the coated layer formed on only one face of medium-grade paper and the like, or refers to the total of the thicknesses of the coated layers formed on both faces of medium-grade paper.

The substrate preferably has a thickness of 150 μm or more and 180 μm or less, more preferably 160 μm or more and 170 μm or less. This can further enhance the easiness of cutting of the thermal transfer image-receiving sheet and the concave curl generation preventiveness thereof.

(Second Extrusion Resin Layer)

The second extrusion resin layer can comprise any of the above-mentioned resin materials, and among the materials, an olefin resin is preferable, and PE is particularly preferable. The amount of the resin material comprised in the second extrusion resin layer is preferably 50 mass % or more and 99 mass % or less, more preferably 70 mass % or more and 95 mass % or less. This can further enhance the density of an image formed on the receiving layer and the concave curl generation preventiveness of the thermal transfer image-receiving sheet.

The second extrusion resin layer can comprise any of the above-mentioned additives to the extent that the characteristics of the present invention are not impaired.

The second extrusion resin layer preferably has a thickness of 5 μm or more and 20 μm or less, more preferably 8 μm or more and 17 μm or less. This can further enhance the density of an image formed on the receiving layer and the concave curl generation preventiveness of the thermal transfer image-receiving sheet.

The second extrusion resin layer can be formed by allowing a mixture comprising the above-mentioned materials to be melt-extruded onto the substrate.

(Porous Layer)

Allowing the thermal transfer image-receiving sheet to have a porous layer enables the thermal loss to be decreased during image formation, enables cushioning properties to be imparted to the thermal transfer image-receiving sheet, and thus, can enhance the density of an image formed on the receiving layer.

In one embodiment, the porous layer is formed of a porous film having microvoids therein.

Examples of a resin material to be formed into a porous film include: olefin resins such as PE and PP; vinyl resins such as polyvinyl acetate, vinyl chloride-vinyl acetate copolymers, and ethylene-vinyl acetate copolymers; ester resins such as PET and PBT; styrene resins; amide resins; and the like.

Among the above-mentioned materials, olefin resins are preferable, and PP is particularly preferable, because these can enhance the density of an image formed on the receiving layer and the concave curl generation preventiveness of the thermal transfer image-receiving sheet.

A porous film can be produced by a known method, and, for example, can be produced by kneading the above-mentioned resin material and incompatible organic microparticles or inorganic particles and then forming the resulting mixture into a film.

In one embodiment, a porous film can be produced by forming a film out of a mixture comprising a first resin material and a second resin material having a higher melting point than the first resin material. In this case, the second resin material functions as a nucleating agent for forming microvoids. The amount of the second resin material to be mixed is preferably 2 parts by mass or more and 10 parts by mass or less with respect to 100 parts by mass of the first resin material. For example, a porous film can be produced by forming a film out of a mixture of PP as the first resin material and a (meth)acryl resin as the second resin material.

In this regard, the porous film is not limited to any one produced by the above-mentioned method, but a commercially available porous film may be used.

The porous film preferably has a porosity of 10 vol % or more and 90 vol % or less, more preferably 15 vol % or more and 80 vol % or less, in terms of thermal insulation properties and cushioning properties.

In the present invention, the porosity is determined by analyzing the cross-sectional SEM (Scanning Electron Microscope) image of a porous film using an image analysis software, ImageJ, and then dividing the area of the void portion by the area of both the void portion and the resin portion. Specifically, the image analysis software binarizes the cross-sectional SEM image, affording a distribution chart showing the void portion as a black region, and thus, the porosity can be measured by determining the ratio of the black region to the cross-sectional area.

The porous layer preferably has a thickness of 10 μm or more and 80 μm or less, more preferably 15 μm or more and 50 μm or less. This can further enhance the density of an image formed on the receiving layer and the concave curl generation preventiveness of the thermal transfer image-receiving sheet.

In forming the porous layer out of a porous film, the porous layer can be formed by laminating the porous film on the substrate with the second extrusion resin layer in between.

In forming the porous layer which is a hollow particle layer, the porous layer can be formed by dispersing or dissolving the above-mentioned hollow particles and binder material in water or a suitable solvent to obtain a coating liquid, applying this coating liquid to the second extrusion resin layer by a known means such as a roll coating method, reverse roll coating method, gravure coating method, reverse gravure coating method, bar coating method, or rod coating method to form a coating film, and then drying the coating film.

(Receiving Layer)

The receiving layer is a layer that receives sublimation dye transferred from a dye layer of the thermal transfer sheet, and retains a formed image.

The receiving layer can comprise a resin material such as an olefin resin, vinyl resin, (meth)acryl resin, cellulose resin, ester resin, amide resin, carbonate resin, styrene resin, urethane resin, or ionomer resin. The receiving layer can comprise two or more of the above-mentioned resin materials.

The amount of the resin material comprised in the receiving layer is preferably 80 mass % or more and 98 mass % or less, more preferably 90 mass % or more and 98 mass % or less.

In one embodiment, the receiving layer comprises a release agent. This can enhance releasability from the thermal transfer sheet.

Examples of release agents include: solid waxes such as polyethylene waxes, amide waxes, and TEFLON (registered trademark) powder; fluorine-based or phosphate-ester-based surfactants; various modified silicone oils such as silicone oils, reactive silicone oils, and curable silicone oils; and various silicone resins. The above-mentioned silicone oils to be used can also be in the form of oil, and are preferably modified silicone oils. Examples of modified silicone oils that can be preferably used include amino-modified silicones, epoxy-modified silicones, aralkyl-modified silicones, epoxy-aralkyl-modified silicones, alcohol-modified silicones, vinyl-modified silicones, urethane-modified silicones, and the like, and particularly preferable ones are epoxy-modified silicones, aralkyl-modified silicones, and epoxy-aralkyl-modified silicones. The receiving layer can comprise two or more of the above-mentioned release agents.

The amount of the release agent comprised in the receiving layer is preferably 0.5 mass % or more and 20 mass % or less, more preferably 0.5 mass % or more and 10 mass % or less.

In addition, the receiving layer can comprise any of the above-mentioned additives to the extent that the characteristics of the present invention are not impaired.

The receiving layer preferably has a thickness of 0.5 μm or more and 20 μm or less, more preferably 1.0 μm or more and 10 μm or less. This can further enhance the density of an image formed on the receiving layer and the concave curl generation preventiveness of the thermal transfer image-receiving sheet.

The receiving layer can be formed by dispersing or dissolving the above-mentioned materials in water or a suitable solvent to obtain a coating liquid, applying this coating liquid to the porous layer by a known means such as a roll coating method, reverse roll coating method, gravure coating method, reverse gravure coating method, bar coating method, or rod coating method to form a coating film, and then drying the coating film.

(Intermediate Layer)

In one embodiment, a thermal transfer image-receiving sheet according to the present invention has an intermediate layer between the substrate and the receiving layer. The intermediate layer has one or more abilities such as solvent resistance, barrier properties, adhesiveness, whitening properties, masking properties, cushioning properties, and antistatic properties.

A thermal transfer image-receiving sheet according to the present invention may have two or more intermediate layers. The two or more intermediate layers may have the same or different abilities.

The intermediate layer can comprise a resin material such as an olefin resin, vinyl resin, (meth)acryl resin, cellulose resin, ester resin, amide resin, carbonate resin, sulfone resin, epoxy resin, styrene resin, or urethane resin. The intermediate layer can comprise two or more of the above-mentioned resin materials.

In one embodiment, the intermediate layer comprises a filler such as titanium oxide, zinc oxide, magnesium carbonate, or calcium carbonate. Allowing the intermediate layer to comprise such a filler enables masking properties to be imparted to the intermediate layer, wherein the masking properties mask nonuniformity or the like of the substrate.

In addition, such an intermediate layer results in having whitening properties, enabling a clearer image to be formed on the receiving layer.

In another embodiment, the intermediate layer comprises an antistatic agent. Examples of antistatic agents include anionic surfactants, cationic surfactants, nonionic surfactants, amphoteric surfactants, and the like.

Examples of anionic surfactants include: carboxylic salts such as N-acyl carboxylic salts, ether carboxylic salts, and aliphatic amine salts; sulfonic salts such as sulfosuccinic salts, ester sulfonic salts, and N-acyl sulfonic salts; sulfuric ester salts such as sulfuric ester salts, alkylsulfuric salts, sulfuric ether salts, and sulfuric amide salts; phosphoric ester salts such as alkylphosphoric salts, phosphoric ether salts, and phosphoric amide salts; and the like.

Examples of cationic surfactants include: amine salts such as alkylamine salts; quaternary ammonium salts such as alkyltrimethylammonium chloride; alkyl imidazoline derivatives such as 1-hydroxyethyl-2-alkyl-2-imidazoline; imidazolinium salts; pyridinium salts; isoquinolinium salts; and the like.

Examples of nonionic surfactants include: ethers such as alkylpolyoxyethylene ether and p-alkylphenylpolyoxyethylene ether; fatty acid sorbitan polyoxyethylene ether, fatty acid sorbitolpolyoxyethylene ether, fatty acid glycerin polyoxyethylene ether, fatty acid polyoxyethylene ester, monoglyceride, diglyceride, sorbitan ester, sucrose ester, divalent alcohol ester, borate dialcohol alkylamine, dialcohol alkylamine ester, fatty acid alkanolamide, N,N-di(polyoxyethylene)alkane amide, alkanolamine ester, N,N-di(polyoxyethylene)alkane amine, amine oxide, alkylpolyethylene imine, and the like.

Examples of amphoteric surfactants include monoamino carboxylic acid, polyamino carboxylic acid, N-alkyl amino propionic salt, N,N-di(carboxyethyl)alkyl amine salt, and the like.

Without limitation to the above-mentioned surfactants, examples of antistatic agents that may be used include layered silicic salts, cationic (meth)acryl resins, and polyaniline resins.

In one embodiment, the intermediate layer comprises a fluorescent whitener such as a stilbene compound, benzimidazole compound, and benzoxazole compound. The intermediate layer comprising a fluorescent whitener results in having whitening properties, making it possible to produce an image-printed item having a clearer image.

The intermediate layer can comprise an additive such as: a plasticizer; an ultraviolet absorber such as a hindered amine compound, hindered phenol compound, benzotriazole compound, or benzophenone compound; a color protection agent, a surfactant, a delusterant, a deodorant, a flame retardant, a weathering agent, a yarn friction reducer, a slip agent, an antioxidant, an ion exchanger, a dispersant, or a colorant such as pigment or dye, to the extent that the characteristics of the present invention are not impaired.

The thickness of the intermediate layer is preferably changed suitably in accordance with the required abilities, and, for example, can be 0.1 μm or more and 3 μm or less.

The intermediate layer can be formed by dispersing or dissolving the above-mentioned materials in water or a suitable solvent to obtain a coating liquid, applying this coating liquid to the substrate and the like by a known means such as a roll coating method, reverse roll coating method, gravure coating method, reverse gravure coating method, bar coating method, or rod coating method to form a coating film, and then drying the coating film.

EXAMPLES

Next, the present invention will be further described in detail with reference to Examples, but the present invention is not limited to these Examples. In addition, the below-mentioned amounts, blending ratios, and the like are based on mass unless otherwise specified.

Example 1

A sheet of coated paper A (having a thickness of 165 μm with the coated layers having a thickness of 19 μm (which was the total thickness of the layers on both faces)) was prepared.

The bending resistances of the coated paper A in the MD direction and the TD direction were measured using a Gurley stiffness tester manufactured by Toyo Seiki Seisaku-sho, Ltd. in an environment having a temperature of 25° C. and a humidity of 50% in accordance with the method described in JIS L 1085, and were found to be 1200 mg and 740 mg respectively.

Polyethylene (PE) was melt-extruded onto one face of the coated paper A to form a first extrusion resin layer having a thickness of 30 μm.

PE was melt-extruded onto the other face of the coated paper A to form a second extrusion resin layer having a thickness of 14 μm, and a porous polypropylene (PP) film A having a thickness of 23 μm was laminated with the second extrusion resin layer in between.

A coating liquid having the following composition and used to form a receiving layer was applied to the porous PP film and dried to form a receiving layer having a thickness of 3 μm, thus producing a sublimation type thermal transfer image-receiving sheet.

(Composition of Coating Liquid for Forming Receiving Layer)

Vinyl chloride-vinyl acetate copolymer: 60 parts by mass (SOLBIN (registered trademark) C, manufactured by Nissin Chemical Co., Ltd.)

Epoxy-modified silicone: 1.2 parts by mass (X-22-3000T, manufactured by Shin-Etsu Chemical Co., Ltd.)

Methylstyl-modified silicone: 0.6 parts by mass (X-24-510, manufactured by Shin-Etsu Chemical Co., Ltd.)

Methylethyl ketone: 2.5 parts by mass

Toluene: 2.5 parts by mass

Example 2

A thermal transfer image-receiving sheet was produced in the same manner as in Example 1 except that the thickness of the second extrusion resin layer was changed to 10 μm.

Example 3

A thermal transfer image-receiving sheet was produced in the same manner as in Example 1 except that the thickness of the first extrusion resin layer was changed to 28 μm.

Example 4

A thermal transfer image-receiving sheet was produced in the same manner as in Example 1 except that the coated paper A was changed to coated paper B (having a thickness of 165 μm with the coated layers having a thickness of 10 μm (which was the total thickness of the layers on both faces)) and that the thickness of the first extrusion resin layer was changed to 28 μm. The bending resistances of the coated paper B in the MD direction and the TD direction were measured and found to be 1100 mg and 740 mg respectively.

Example 5

A thermal transfer image-receiving sheet was produced in the same manner as in Example 1 except that the coated paper A was changed to high-quality paper A (having a thickness of 165 μm). The bending resistances of the high-quality paper A in the MD direction and the TD direction were measured and found to be 1180 mg and 800 mg respectively.

Comparative Example 1

A thermal transfer image-receiving sheet was produced in the same manner as in Example 1 except that the coated paper A was changed to coated paper C (having a thickness of 152 μm with the coated layers having a thickness of 10 μm (which was the total thickness of the layers on both faces)). The bending resistances of the coated paper C in the MD direction and the TD direction were measured and found to be 900 mg and 640 mg respectively.

Comparative Example 2

A thermal transfer image-receiving sheet was produced in the same manner as in Example 1 except that the coated paper A was changed to high-quality paper B (having a thickness of 160 μm). The bending resistances of the high-quality paper B in the MD direction and the TD direction were measured and found to be 900 mg and 500 mg respectively.

Comparative Example 3

A thermal transfer image-receiving sheet was produced in the same manner as in Example 1 except that the coated paper A was changed to high-quality paper A and that the thickness of the first extrusion resin layer was changed to 26 μm.

Comparative Example 4

A thermal transfer image-receiving sheet was produced in the same manner as in Example 1 except that the coated paper A was changed to coated paper D (having a thickness of 260 μm with the coated layers having a thickness of 20 μm (which was the total thickness of the layers on both faces)). The bending resistances of the coated paper D in the MD direction and the TD direction were measured and found to be 1600 mg and 1000 mg respectively.

Comparative Example 5

A thermal transfer image-receiving sheet was produced in the same manner as in Example 1 except that the porous PP film A was changed to a porous PP film B having a thickness of 35 μm.

Comparative Example 6

A thermal transfer image-receiving sheet was produced in the same manner as in Example 1 except that the thickness of the second extrusion resin layer was changed to 10 μm and that the porous PP film A was changed to a porous PP film C having a thickness of 20 μm.

Comparative Example 7

A thermal transfer image-receiving sheet was produced in the same manner as in Example 1 except that the thickness of the first extrusion resin layer was changed to 26 μm.

Comparative Example 8

A thermal transfer image-receiving sheet was produced in the same manner as in Example 1 except that the coated paper A was changed to high-quality paper C having a thickness of 154 μm, that the thickness of the first extrusion resin layer was changed to 26 μm, and that the porous PP film A was changed to the porous PP film B. The bending resistances of the high-quality paper C in the MD direction and the TD direction were measured and found to be 900 mg and 540 mg respectively.

The thermal transfer image-receiving sheet produced in each of Examples and Comparative Examples was subjected to the following tests for evaluation.

<<Evaluation of Image Density>>

Figure 2:
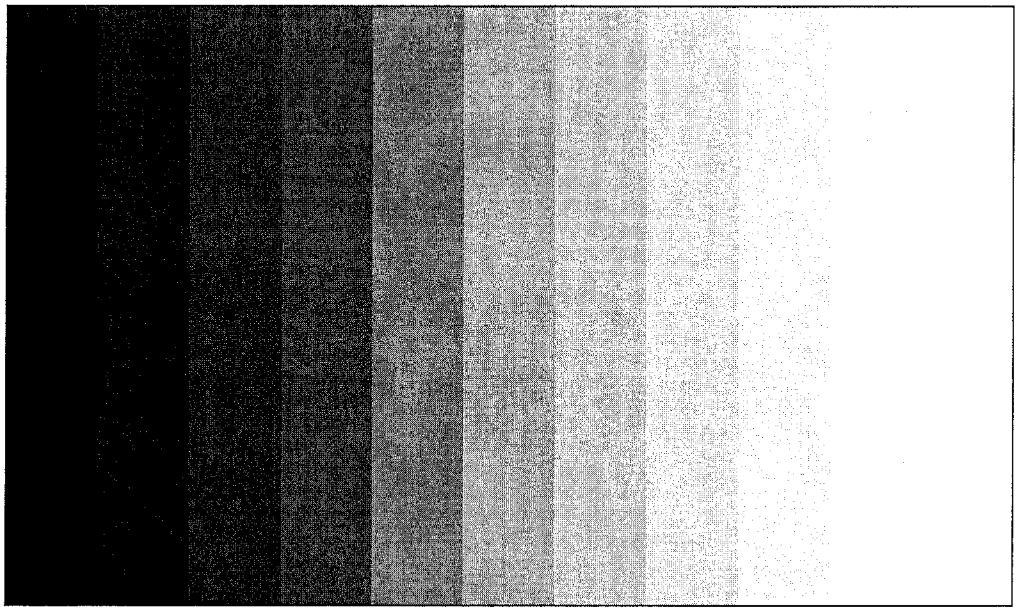
FIG. 2 is a view showing an 11-STEP image formed on the receiving layer of the thermal transfer image-receiving sheet in Examples.

Using a sublimation type thermal transfer printer (DS621, manufactured by Dai Nippon Printing Co., Ltd.) and a genuine thermal transfer sheet (manufactured by Dai Nippon Printing Co., Ltd.) for the printer, an 11-STEP image such as shown in FIG. 2 was formed on the receiving layer of the thermal transfer image-receiving sheet obtained in each Example and Comparative Example to produce an image-printed item (4 inches×6 inches). Here, the 11-STEP image is an image having 11 gradated steps of density ranging from white to black.

The OD value of the 11th step of the formed 11-STEP image was measured using an optical densitometer (i1-pro2, manufactured by X-Rite Inc., in accordance with Ansi-A, having a D65 light source, at a measurement angle of 2°, and having no filter), and the image density was rated on the basis of the following rating criteria. The evaluation results are listed in Table 1.

(Rating Criteria)

A: The OD value was 1.95 or more.

NG: The OD value was less than 1.95.

<<Evaluation of Concave Curl Generation Preventiveness>>

An image-printed item formed immediately after the image formation (within one minute after the formation) and an image-printed item left to stand for one month in an environment of 20° C. and 65% (relative humidity) were placed on a flat table, and the heights up to which the four corners were curled were measured.

The largest one of the heights up to which the four corners were curled was regarded as the amount of curl, and the concave curl generation preventiveness was rated on the basis of the following rating criteria. The evaluation results are listed in Table 1.

(Rating Criteria)

A: A curl convex on the receiving layer side was generated, and the amount of the curl was 4 mm or more.

B: No curl was generated, or a convex curl was generated on the receiving layer side, wherein the amount of the curl was less than 4 mm.

NG: A curl concave on the receiving layer side was generated.

<<Evaluation of Easiness of Cutting>>

In production of the above-mentioned image-printed item, an electric current probe was connected to a conducting wire of the motor in the cutter mechanism of the sublimation type thermal transfer printer; an electric current value was measured when the image-printed item was cut in the TD direction; and the easiness of cutting was rated on the basis of the following rating criteria. The evaluation results are listed in Table 1.

(Rating Criteria)

A: The electric current value was less than 1.5 A.

NG: The electric current value was 1.5 A or more.

REFERENCE SIGNS LIST

10: thermal transfer image-receiving sheet
11: first extrusion resin layer
12: substrate
13: second extrusion resin layer
14: porous layer
15: receiving layer

The invention claimed is:

1. A thermal transfer image-receiving sheet comprising:

a first extrusion resin layer, a substrate, a second extrusion resin layer, a porous layer, and a receiving layer, in this order, wherein a ratio of a total of a thickness of the second extrusion resin layer and a thickness of the porous layer to a thickness of the first extrusion resin layer (the total of the thickness of the second extrusion resin layer and the thickness of the porous layer/the thickness of the first extrusion resin layer) is 1.05 or more and 1.40 or less, wherein the substrate has a bending resistance in a range of 1800 mgf or more and 2300 mgf or less, and wherein the bending resistance in a machine direction (MD) is higher than the bending resistance in a transverse direction (TD).

2. The thermal transfer image-receiving sheet according to claim 1, wherein the substrate is coated paper.

3. The thermal transfer image-receiving sheet according to claim 2, wherein a ratio of a thickness of a coated layer of the coated paper to the thickness of the coated paper (the

TABLE 1

| | Substrate | | | | Thickness of Layer | | | | Performance Evaluation | | | |
|---|---|---|---|---|---|---|---|---|---|---|---|---|
| | | | | | | | | | | Evaluation of Concave Curl Generation Preventiveness | | |
| | Type | Thickness (μm) | Thickness of Coated Layer/Thickness of Coated paper × 100 (%) | Bending Resistance (mg) | (A) First Extrusion Resin Layer (μm) | (B) Second Extrusion Resin Layer (μm) | (C) Porous Layer (μm) | (B) + (C)/(A) | Evaluation of Image Density | immediately after image was formed | after being left to stand for one month | Evaluation of Easiness of Cutting |
| Example 1 | Coated paper | 165 | 11.52 | 1940 | 30 | 14 | 23 | 1.23 | A | A | A | A |
| Example 2 | Coated paper | 165 | 11.52 | 1940 | 30 | 10 | 23 | 1.10 | A | A | A | A |
| Example 3 | Coated paper | 165 | 11.52 | 1940 | 28 | 14 | 23 | 1.32 | A | A | A | A |
| Example 4 | Coated paper | 165 | 6.06 | 1840 | 28 | 14 | 23 | 1.32 | A | A | B | A |
| Example 5 | High-quality Paper | 165 | — | 1980 | 30 | 14 | 23 | 1.23 | A | A | B | A |
| Comparative Example 1 | Coated paper | 152 | 6.58 | 1540 | 30 | 14 | 23 | 1.23 | A | A | NG | A |
| Comparative Example 2 | High-quality Paper | 160 | — | 1400 | 30 | 14 | 23 | 1.23 | A | A | NG | A |
| Comparative Example 3 | High-quality Paper | 165 | — | 1980 | 26 | 14 | 23 | 1.42 | A | A | NG | A |
| Comparative Example 4 | Coated paper | 260 | 7.69 | 2600 | 30 | 14 | 23 | 1.23 | A | A | A | NG |
| Comparative Example 5 | Coated paper | 165 | 11.52 | 1940 | 30 | 14 | 35 | 1.63 | A | A | NG | A |
| Comparative Example 6 | Coated paper | 165 | 11.52 | 1940 | 30 | 10 | 20 | 1.00 | NG | A | B | A |
| Comparative Example 7 | Coated paper | 165 | 11.52 | 1940 | 26 | 14 | 23 | 1.42 | A | A | NG | A |
| Comparative Example 8 | High-quality Paper | 154 | — | 1440 | 26 | 14 | 35 | 1.88 | A | B | NG | A |

thickness of the coated layer/the thickness of the coated paper×100) is 5% or more and 20% or less.

4. The thermal transfer image-receiving sheet according to claim 1, wherein at least one of the first extrusion resin layer and the second extrusion resin layer comprises an olefin resin.

5. The thermal transfer image-receiving sheet according to claim 1, wherein the porous layer is formed of a porous film.

6. The thermal transfer image-receiving sheet according to claim 1, wherein the bending resistance is in a range of 1100 mgf or more and 1400 mgf or less in the MD direction.

7. The thermal transfer image-receiving sheet according to claim 1, wherein the bending resistance is in a range of 700 mgf or more and 900 mgf or less in the TD direction.

* * * * *